United States Patent
Chen et al.

(10) Patent No.: US 11,995,751 B2
(45) Date of Patent: May 28, 2024

(54) VIDEO PREVIEW METHOD AND APPARATUS, AND NON-TRANSITORY COMPUTER-READABLE STORAGE MEDIUM

(71) Applicant: BEIJING BYTEDANCE NETWORK TECHNOLOGY CO., LTD., Beijing (CN)

(72) Inventors: Yue Chen, Beijing (CN); Anqi Wang, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 17/854,015

(22) Filed: Jun. 30, 2022

(65) Prior Publication Data
US 2023/0222722 A1    Jul. 13, 2023

(30) Foreign Application Priority Data
Jan. 10, 2022    (CN) .......................... 202210022120.6

(51) Int. Cl.
G06T 13/40    (2011.01)
G06V 20/40    (2022.01)

(52) U.S. Cl.
CPC .............. G06T 13/40 (2013.01); G06V 20/47 (2022.01)

(58) Field of Classification Search
None
See application file for complete search history.

(56) References Cited

U.S. PATENT DOCUMENTS

| 10,963,145 | B1 | 3/2021 | Voss et al. | |
| 2007/0128899 | A1* | 6/2007 | Mayer | G06F 9/4406 |
| | | | | 439/152 |
| 2017/0046751 | A1* | 2/2017 | Kirillov | G06Q 30/0277 |
| 2017/0264934 | A1* | 9/2017 | Guo | H04N 21/8547 |
| 2017/0332044 | A1 | 11/2017 | Marlow et al. | |
| 2022/0078510 | A1* | 3/2022 | Mulase | H04N 21/4821 |
| 2022/0207875 | A1* | 6/2022 | Kopparapu | G06V 10/774 |

FOREIGN PATENT DOCUMENTS

| CN | 101599017 A | 12/2009 |
| CN | 105094513 A | 11/2015 |
| CN | 105635232 A | 6/2016 |
| CN | 303805790 S | 8/2016 |
| CN | 106649518 A | 5/2017 |

(Continued)

OTHER PUBLICATIONS

Notice of Allowance dated Aug. 31, 2023 in CN Appl. No. 202210022120.6, English translation (6 pages).

*Primary Examiner* — Tize Ma

(57) ABSTRACT

This disclosure relates to a video processing method and apparatus, and a non-transitory computer-readable storage medium, and relates to the field of computer technologies. The processing method includes: presenting an avatar of at least one user; under the condition that a first user exists in the at least one user, playing a dynamic image within an area where an avatar of the first user is located, wherein the first user is a user who has posted a video content within a preset duration, and the dynamic image is a related image of the video content; and presenting the video content posted by the first user in response to an operation of a second user on the dynamic image.

18 Claims, 6 Drawing Sheets

(56) References Cited

FOREIGN PATENT DOCUMENTS

| | | |
|---|---|---|
| CN | 106815345 A | 6/2017 |
| CN | 110012339 A | 7/2019 |
| CN | 306071848 S | 9/2020 |
| CN | 111818358 A | 10/2020 |
| CN | 306155637 S | 11/2020 |
| CN | 306328836 S | 2/2021 |
| CN | 112511889 A | 3/2021 |
| CN | 113032081 A | 6/2021 |
| CN | 113179208 A | 7/2021 |
| CN | 113194351 A | 7/2021 |
| CN | 113542801 A | 10/2021 |
| CN | 113553472 A | 10/2021 |
| CN | 113904886 A | 1/2022 |
| CN | 114363688 A | 4/2022 |
| WO | 2020149366 A1 | 7/2020 |

\* cited by examiner

VIDEO PREVIEW METHOD AND APPARATUS, AND NON-TRANSITORY COMPUTER-READABLE STORAGE MEDIUM

CROSS-REFERENCE TO RELATED APPLICATIONS

The present application is based on the application with a CN application number of 202210022120.6 and the filing date being Jan. 10, 2022, and claims its priority. The disclosure of this CN application as a whole is incorporated into the present application herein by reference.

TECHNICAL FIELD

This disclosure relates to the field of computer technologies, and particularly to a video processing method, a video processing apparatus, and a non-transitory computer-readable storage medium.

BACKGROUND

In the related art, an avatar of a video uploading user is in a form of a static picture, and a video browsing user, after clicking on the avatar in an application, enters a personal homepage of the video uploading user.

SUMMARY

According to some embodiments of the present disclosure, there is provided a video processing method, comprising: presenting an avatar of at least one user; under the condition that a first user exists in the at least one user, playing a dynamic image within an area where an avatar of the first user is located, wherein the first user is a user who has posted a video content within a preset duration, and the dynamic image is a related image of the video content; and presenting the video content posted by the first user in response to an operation of a second user on the dynamic image.

According to other embodiments of the present disclosure, there is provided a video processing apparatus, comprising: a display configured to present an avatar of at least one user and present a video content posted by a first user in response to an operation of a second user on dynamic image, wherein the first user is a user who has posted the video content within a preset duration, and the dynamic image is a related image of the video content; and a processor configured to play the dynamic image within an area where an avatar of the first user is located under the condition that the first user exists in the at least one user.

According to still other embodiments of the present disclosure, there is provided a video processing apparatus, comprising: a presentation module configured to present an avatar of at least one user and present a video content posted by a first user in response to an operation of a second user on dynamic image, wherein the first user is a user who has posted the video content within preset duration, and the dynamic image is a related image of the video content; and a playing module configured to play the dynamic image within an area where an avatar of the first user is located under the condition that the first user exists in the at least one user.

According to still other embodiments of the present disclosure, there is provided a video processing apparatus, comprising: a memory; and a processor coupled to the memory, the processor being configured to perform, based on instructions stored in the memory, the video processing method in any of the above embodiments.

According to further embodiments of the present disclosure, there is provided a non-transitory computer-readable storage medium having thereon stored a computer program which, when executed by a processor, implements the video processing method in any of the above embodiments.

BRIEF DESCRIPTION OF THE DRAWINGS

The accompanying drawings, which constitute a part of this specification, illustrate embodiments of the present disclosure and together with the specification, serve to explain the principles of the present disclosure.

The present disclosure can be more clearly understood from the following detailed description taken with reference to the accompanying drawings, in which.

DETAILED DESCRIPTION

Figure 1:
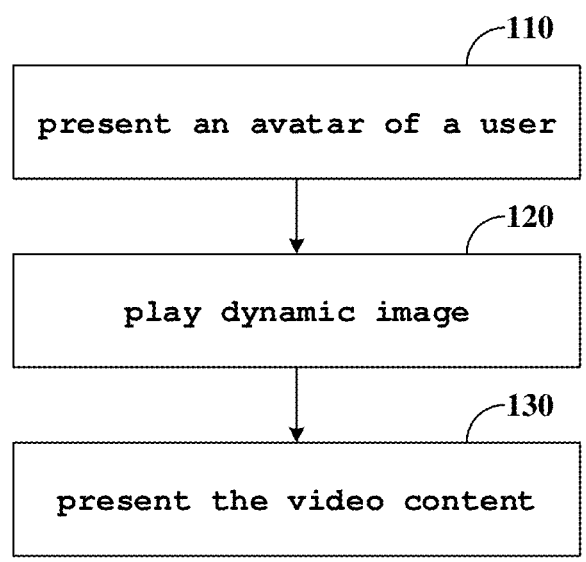
FIG. 1 shows a flow diagram of some embodiments of a video processing method of the present disclosure.

Various exemplary embodiments of the present disclosure will now be described in detail with reference to the accompanying drawings. It should be noted that: relative arrangements, numerical expressions and numerical values of components and steps that are set forth in these embodiments do not limit the scope of the present disclosure unless otherwise specified.

Meanwhile, it should be understood that sizes of the portions shown in the drawings are not drawn in an actual scale for ease of description.

The following description of at least one exemplary embodiment is merely illustrative in nature and is in no way intended to limit the present disclosure and its application or uses.

A technique, method, and device known to one of ordinary skill in the related art may not be discussed in detail but are intended to be part of the specification where appropriate.

In all examples shown and discussed herein, any specific value should be construed as exemplary only and not as a limitation. Thus, other examples of the exemplary embodiments can have different values.

It should be noted that: similar reference numbers and letters refer to similar items in the following figures, and therefore, once a certain item is defined in one figure, it need not be discussed further in subsequent figures.

A video browsing user cannot learn that a video uploading user has uploaded a new video through an avatar in a form of a static picture. Even if a form of adding a halo outside the static picture is employed to convey that the video uploading user has uploaded the new video, it is hard for the video browsing user to understand information to be conveyed by the form. This will result in a dropped click-through rate of the video browsing user.

Moreover, entering a personal homepage of the video uploading user after the avatar is clicked will also reduce an expectation of the video browsing user after the clicking, thereby resulting in a dropped click-through rate of the video browsing user.

In view of the above technical problems, in this disclosure, by pre-playing a video content posted by the video uploading user within an area where an avatar of the video uploading user is located, information that the video uploading user has uploaded the new video is better conveyed to the video browsing user. In this way, the click-through rate of the video browsing user can be increased.

Moreover, according to the present disclosure, after the avatar of the video uploading user is clicked, the new video uploaded by the video uploading user is entered. In this way, a correct click expectation can be established for the video browsing user, thereby increasing the click-through rate of the video browsing user.

FIG. 1 shows a flow diagram of some embodiments of a video processing method of the present disclosure.

As shown in FIG. 1, in step 110, an avatar of at least one user is presented.

In some embodiments, an avatar of a first user is presented in response to a user presentation area in an interactive interface being opened by a second user. For example, the user presentation area is a sidebar located on one side of the interactive interface, and the second user can open the sidebar by clicking a button on the interactive interface.

In some embodiments, a user list containing avatars of a plurality of users is presented, the plurality of users comprising a plurality of first users. The first user is a user who has posted a video content within a preset duration, and dynamic image is a related image of the video content.

In some embodiments, an area where the avatar of the first user in the plurality of users is located is provided with a highlighted identification which is used for indicating the first user in the plurality of users. For example, after the second user enters the sidebar, if the user list in the sidebar contains first users, specific-color circles are displayed outside avatars of all the first users.

Figure 2A:
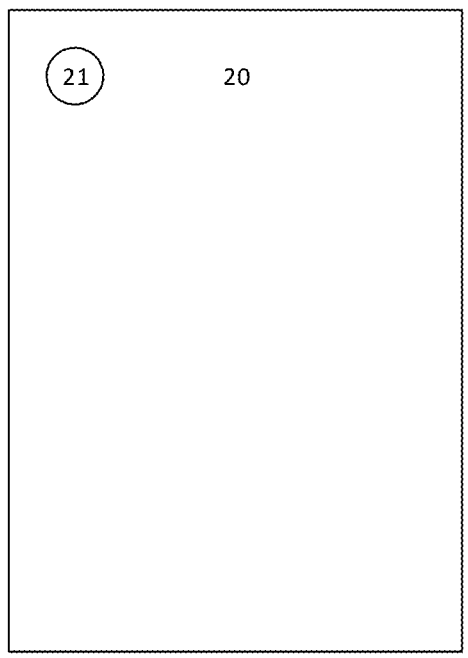
FIGS. 2a to 2d show schematic diagrams of some embodiments of a video processing method of the present disclosure.
Figure 2B:
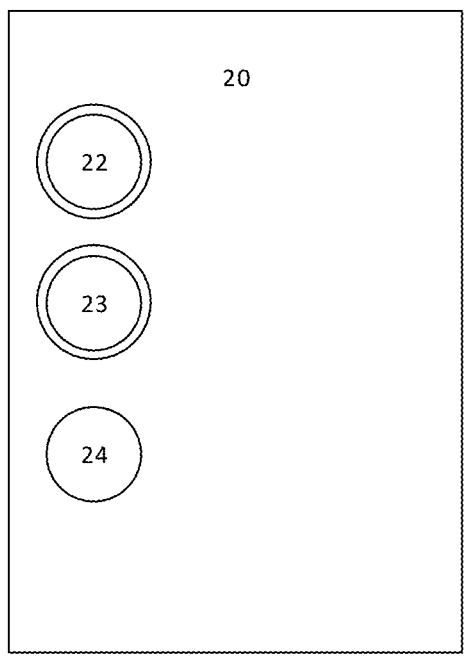

FIGS. 2a, 2b show schematic diagrams of some embodiments of a video processing method of the present disclosure.

As shown in FIG. 2a, the second user enters the sidebar containing the user list by clicking on a button 21 in an interactive interface 20.

As shown in FIG. 2b, the user list contains user avatars 22, 23, and 24. Users corresponding to the user avatars 22 and 23 belong to the first users, and circle identifications are provided outside their avatars.

In step 120, dynamic image are played within the area where the avatar of the first user is located under the condition that the first user exists in the at least one user.

For example, after the second user enters a "story (time-limited dynamic)" sidebar, if the user list in the sidebar contains first users, blue circles are displayed outside avatars of all the first users; and a display content within an area of an avatar of the second user becomes preview image of a first video content in a video uploading list of the second user.

In some embodiments, preview image are generated as the dynamic image according to the video content posted by the first user within the preset duration.

For example, under the condition that a duration of a video content exceeds a threshold, a video clip with a duration corresponding to the threshold is intercepted in the video content as preview image; and under the condition that the duration of the video content does not exceed the threshold, the whole video content is taken as preview image.

For example, the threshold is 5 seconds. The display content within the area of the avatar of the second user is changed from an original static picture to a video clip with a duration of 5 seconds or a video content with a duration of less than 5 seconds, in a video fading-in manner.

For example, a plurality of video frames are extracted from the video content; and according to the plurality of video frames, a dynamic picture is generated as preview image.

For example, preview image can be acquired by extracting a plurality of key frames from a newly uploaded video content to form a Gif (Graphics Interchange Format) dynamic picture.

In some embodiments, according to a sequence of the plurality of first users arranged in the user list, dynamic image corresponding to the plurality of first users are sequentially played within areas where the avatars of the plurality of first users are located.

Figure 2C:
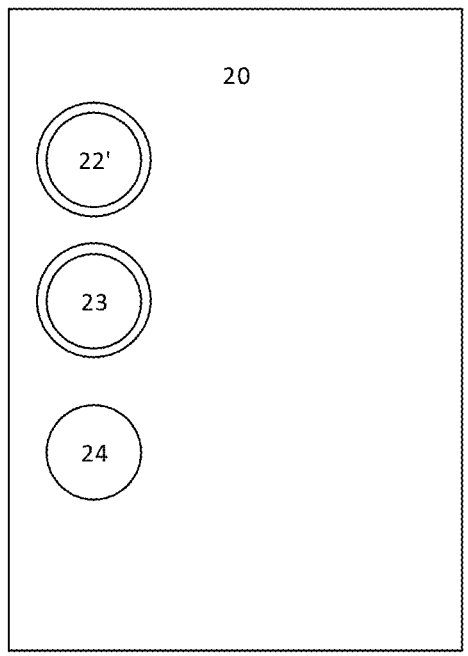
Figure 2D:
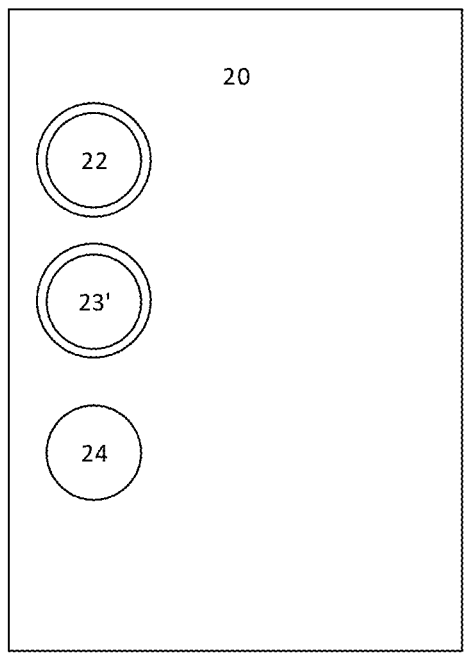

FIGS. 2c and 2d show schematic diagrams of some embodiments of a video processing method of the present disclosure.

As shown in FIG. 2c, after the second user enters the sidebar, a system automatically plays preview image of a user corresponding to the user avatar 22 within an area of the user avatar 22, so that the user avatar 22 becomes a preview image playing area 22'.

As shown in FIG. 2d, after the playing of the preview image is finished, the preview image playing area 22' is changed back to the user avatar 22; and preview image of a user corresponding to the user avatar 23 are automatically played in an area of the user avatar 23, so that the user avatar 23 becomes a preview image playing area 23'.

In some embodiments, the area where the avatar of the first user is located is enlarged-displayed; and the dynamic image are played within the enlarged display area where the avatar of the first user is located.

In some embodiments, after the playing of the dynamic image is finished, the enlarged display area where the avatar of the first user is located is reduced to a size before the enlarging and displaying. For example, according to a sequence of the plurality of first users arranged in the user list, areas where avatars of the plurality of first users are located are sequentially enlarged, and corresponding dynamic image of the plurality of first users are sequentially played within the enlarged areas where the avatars are located.

For example, after the second user enters the sidebar, the avatar of the first user is enlarged, and preview image of the video content are played within the area of the avatar of the first user; and after the playing is finished, an original static picture within the area of the avatar of the first user is displayed, and the area of the avatar of the first user is restored to an original size.

Figure 3A:
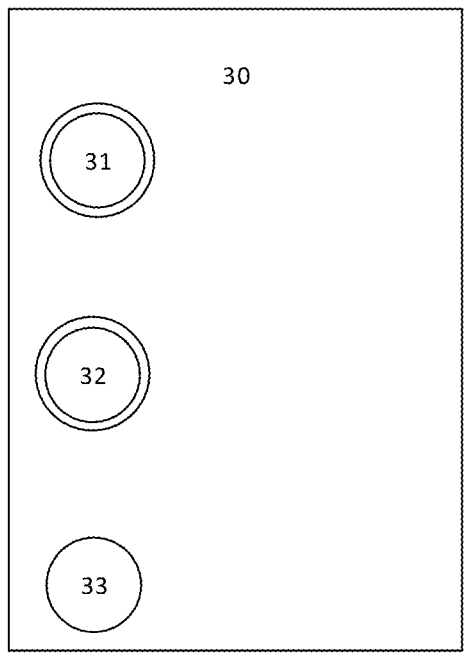
FIGS. 3a to 3c show schematic diagrams of other embodiments of a video processing method of the present disclosure.
Figure 3B:
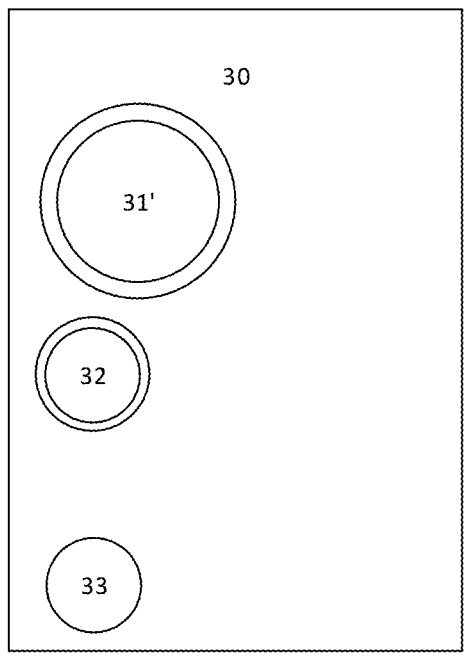
Figure 3C:
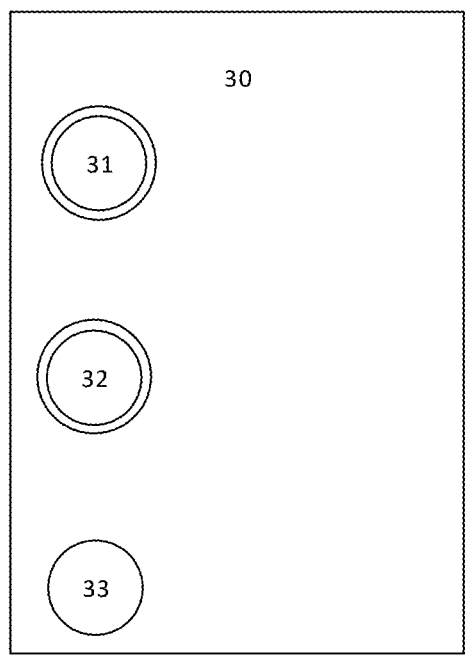

FIGS. 3a to 3c show schematic diagrams of other embodiments of a video processing method of the present disclosure.

As shown in FIG. 3a, a user list in an interactive interface 30 contains user avatars 31, 32, and 33, which are static pictures. Users corresponding to the user avatars 31 and 32 belong to the first users, and circle identifications are provided outside their avatars.

As shown in FIG. 3b, after the second user enters the sidebar, the system automatically enlarges an area where the user avatar 31 is located, and plays preview image of a corresponding user within the enlarged area, so that the user avatar 31 becomes a preview image playing area 31'.

As shown in FIG. 3c, after the playing of the preview image is finished, the preview image playing area 31' is changed back to the user avatar 31. For example, thereafter, the system automatically enlarges an area where the user avatar 32 is located according to an arrangement sequence of the avatar list, and repeats the above steps, in which the area where the user avatar 32 is located is enlarged, and preview image of a corresponding user are played.

In step 130, the video content posted by the first user is presented in response to an operation of the second user on the dynamic image.

In some embodiments, the video content posted by the first user is played in response to the operation of the second user on the dynamic image.

In some embodiments, a playing frame rate of the dynamic image is determined according to performance of a video playing terminal, wherein the higher the performance of the video playing terminal, the higher the playing frame rate of the dynamic image. For example, if the video playing terminal is a medium/high-end mobile phone, the playing frame rate of 12 frames per second is employed; and if the video playing terminal is a low-end mobile phone, the playing frame rate of 6 frames per second is employed.

In the above embodiments, pre-playing the video content posted by the user within the avatar of the video uploading user better helps the video browsing user know about video updates. The video browsing user can be better guided to click on the avatar of the video uploading user who has updated the video, thereby increasing the click-through rate.

In addition, by enlarging the area where the avatar is located and playing the preview image, the technical effect of enlarging the preview image is achieved, which avoids confusion with an ordinary dynamic avatar or a live-streaming user and better helps the video browsing user know about the video updates.

According to some embodiments of the present disclosure, there is provided a video processing method, comprising: presenting an avatar of at least one user; under the condition that a first user exists in the at least one user, playing a dynamic image within an area where an avatar of the first user is located, wherein the first user is a user who has posted a video content within a preset duration, and the dynamic image is a related image of the video content; and presenting the video content posted by the first user in response to an operation of a second user on the dynamic image.

In some embodiments, the processing method further comprises: generating a preview image as the dynamic image according to the video content posted by the first user within the preset duration.

In some embodiments, the generating a preview image according to the video content posted by the first user within the preset duration comprises: under the condition that a duration of the video content exceeds a threshold, intercepting, in the video content, a video clip with a duration corresponding to the threshold as the preview image; and under the condition that the duration of the video content does not exceed the threshold, taking the whole video content as the preview image.

In some embodiments, the generating a preview image according to the video content posted by the first user within the preset duration comprises: extracting a plurality of video frames from the video content; and generating a dynamic picture as the preview image according to the plurality of video frames.

In some embodiments, the presenting an avatar of at least one user comprises: presenting a user list containing avatars of a plurality of users, the plurality of users comprising a plurality of first users; and under the condition that the first users exist in the users, the playing a dynamic image within an area where an avatar of the first user is located comprises: sequentially playing the dynamic image corresponding to the plurality of first users within areas where the avatars of the plurality of first users are located according to a sequence of the plurality of first users arranged in the user list.

In some embodiments, the presenting an avatar of at least one user comprises: presenting a user list containing avatars of a plurality of users, the area where the avatar of the first user in the plurality of users is located being provided with a highlighted identification which is used for indicating the first user in the plurality of users.

In some embodiments, the presenting the video content posted by the first user in response to an operation of a second user on the dynamic image comprises: playing the video content posted by the first user in response to the operation of the second user on the dynamic image.

In some embodiments, the playing a dynamic image within an area where an avatar of the first user is located comprises: enlarging and displaying the area where the avatar of the first user is located; and playing the dynamic image within the enlarged display area where the avatar of the first user is located.

In some embodiments, the processing method further comprises: after the playing of the dynamic image is finished, reducing the enlarged display area where the avatar of the first user is located to a size before the enlarging and displaying.

In some embodiments, the presenting an avatar of at least one user comprises: presenting the avatar of the first user in response to a user presentation area in an interactive interface being opened by the second user.

In some embodiments, the playing a dynamic image within an area where an avatar of the first user is located comprises: determining a playing frame rate of the dynamic image according to performance of a video playing terminal, wherein the higher the performance of the video playing terminal, the higher the playing frame rate of the dynamic image.

Figure 4A:
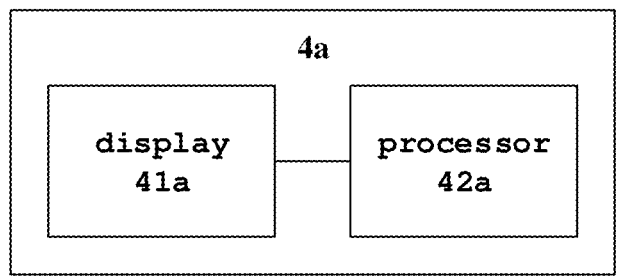
FIG. 4a shows a block diagram of some embodiments of a video processing apparatus of the present disclosure.

FIG. 4a shows a block diagram of some embodiments of a video processing apparatus of the present disclosure.

As shown in FIG. 4a, a video processing apparatus 4a comprises: a display 41a configured to present an avatar of at least one user, and present a video content posted by a first user in response to an operation of a second user on dynamic image, wherein the first user is a user who has posted the video content within a preset duration, and the dynamic image is a related image of the video content; and a processor 42a configured to play the dynamic image within an area where an avatar of the first user is located under the condition that the first user exists in the at least one user.

In some embodiments, the processor 42a generates preview image as the dynamic image according to the video content posted by the first user within the preset duration.

In some embodiments, the processor 42a, under the condition that a duration of the video content exceeds a threshold, intercepts, in the video content, a video clip with a duration corresponding to the threshold as the preview image; and takes the whole video content as the preview image under the condition that the duration of the video content does not exceed the threshold.

In some embodiments, the processor 42a extracts a plurality of video frames from the video content; and generates a dynamic picture as the preview image according to the plurality of video frames.

In some embodiments, the display 41a presents a user list containing avatars of a plurality of users, the plurality of users comprising a plurality of first users; and the processor 42a sequentially plays corresponding dynamic image of the plurality of first users in areas where the avatars of the plurality of first users are located according to a sequence of the plurality of first users arranged in the user list.

In some embodiments, the display 41a presents a user list containing avatars of a plurality of users, the area where the avatar of the first user in the plurality of users is located being provided with a highlighted identification which is used for indicating the first user in the plurality of users.

In some embodiments, the processor 42a plays the video content posted by the first user in response to an operation of a second user on the dynamic image.

In some embodiments, the display 41an enlarge-displays the area where the avatar of the first user is located; and the processor 42a plays the dynamic image within the enlarged display area where the avatar of the first user is located.

In some embodiments, after the playing of the dynamic image is finished, the display 41a zooms out the enlarged display area where the avatar of the first user is located to a size before the enlarging and displaying.

In some embodiments, the display 41a presents the avatar of the first user in response to a user presentation area in an interactive interface being opened by the second user.

In some embodiments, the display 41a determines a playing frame rate of the dynamic image according to performance of a video playing terminal, wherein the higher the performance of the video playing terminal, the higher the playing frame rate of the dynamic image.

Figure 4B:
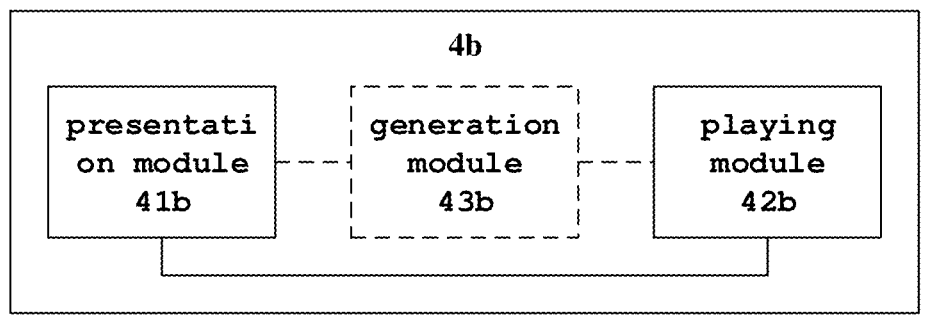
FIG. 4b shows a block diagram of other embodiments of a video processing apparatus of the present disclosure.

FIG. 4b shows a block diagram of other embodiments of a video processing apparatus of the present disclosure.

As shown in FIG. 4b, a video processing apparatus 4b comprises: a presentation module 41b configured to present an avatar of at least one user and present a video content posted by a first user in response to an operation of a second user on dynamic image, wherein the first user is a user who has posted the video content within a preset duration, and the dynamic image is a related image of the video content; and a playing module 42b configured to play the dynamic image within an area where an avatar of the first user is located under the condition that the first user exists in the at least one user.

In some embodiments, the processing apparatus 4b further comprises a generation module 43b configured to generate preview image as the dynamic image according to the video content posted by the first user within the preset duration.

In some embodiments, the generation module 43b, under the condition that a duration of the video content exceeds a threshold, intercepts, in the video content, a video clip with a duration corresponding to the threshold as the preview image; and the generation module 43b takes the whole video content as the preview image under the condition that the duration of the video content does not exceed the threshold.

In some embodiments, the generation module 43b extracts a plurality of video frames from the video content; and generates a dynamic picture as the preview image according to the plurality of video frames.

In some embodiments, the presentation module 41b presents a user list containing avatars of a plurality of users, the plurality of users comprising a plurality of first users; and the playing module 42b sequentially plays dynamic image corresponding to the plurality of first users in areas where the avatars of the plurality of first users are located according to a sequence of the plurality of first users arranged in the user list.

In some embodiments, the presentation module 41b presents a user list containing avatars of the plurality of users, the area where the avatar of the first user in the plurality of users is located being provided with a highlighted identification which is used for indicating the first user in the plurality of users.

In some embodiments, the playing module 42b plays the video content posted by the first user in response to the operation of the second user on the dynamic image.

In some embodiments, the presentation module 41b enlarge-displays the area where the avatar of the first user is located; and the playing module 42b plays the dynamic image within the enlarged display area where the avatar of the first user is located.

In some embodiments, after the playing of the dynamic image is finished, the presentation module 41b zooms out the enlarged display area where the avatar of the first user is located to a size before the enlarging and displaying.

In some embodiments, the presentation module 41b presents the avatar of the first user in response to a user presentation area in an interactive interface being opened by the second user.

In some embodiments, the playing module 42b determines a playing frame rate of the dynamic image according to performance of a video playing terminal, wherein the higher the performance of the video playing terminal, the higher the playing frame rate of the dynamic image.

Figure 5:
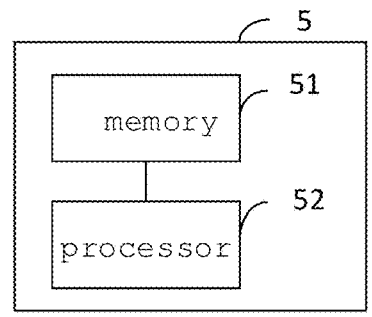
FIG. 5 shows a block diagram of still other embodiments of a video processing apparatus of the present disclosure.

FIG. 5 shows a block diagram of still other embodiments of a video processing apparatus of the present disclosure.

As shown in FIG. 5, a video processing apparatus 5 of this embodiment comprises: a memory 51 and a processor 52 coupled to the memory 51, the processor 52 being configured to perform, based on instructions stored in the memory 51, the video processing method in any of the embodiments in the present disclosure.

The memory 51 can comprise, for example, a system memory, a fixed non-transitory storage medium, and the like. The system memory has stored thereon, for example, an operating system, an application, a boot loader, a database, other programs, and the like.

Figure 6:
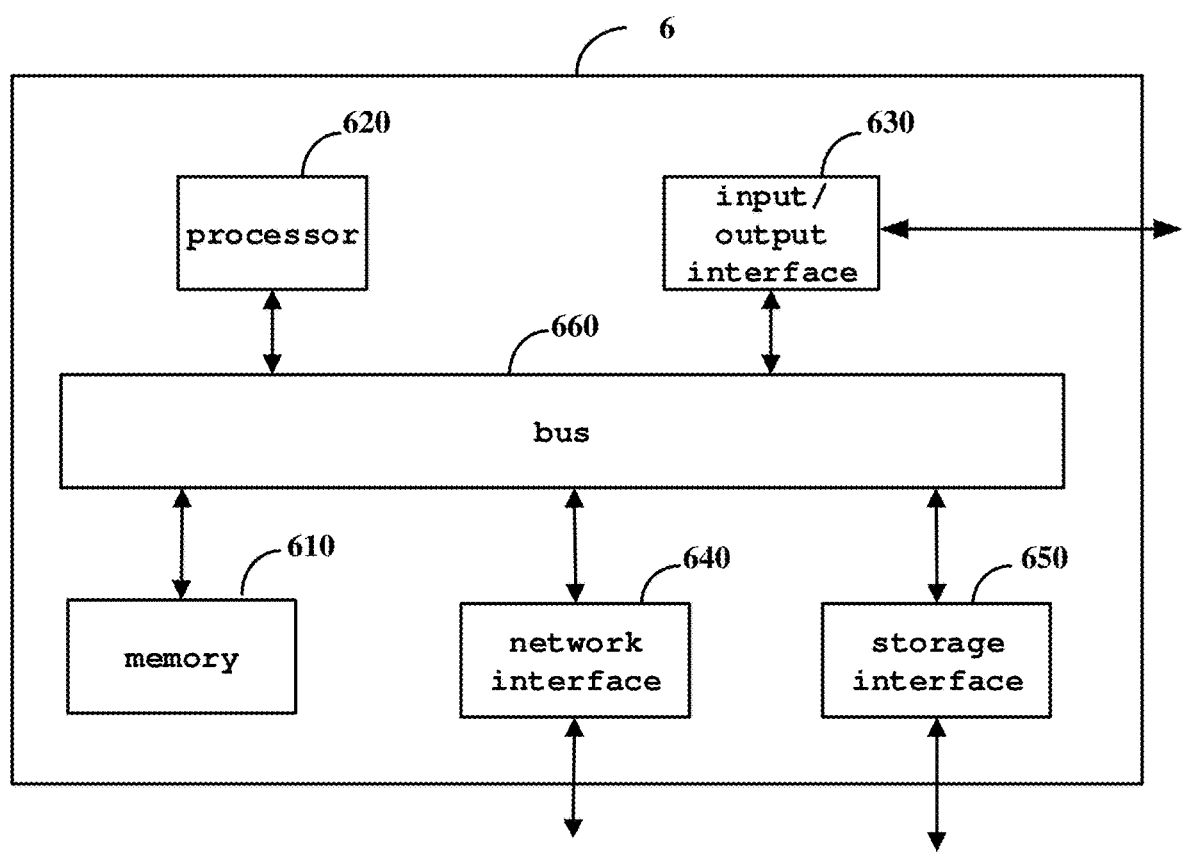
FIG. 6 shows a block diagram of further embodiments of a video processing apparatus of the present disclosure.

FIG. 6 shows a block diagram of further embodiments of a video processing apparatus of the present disclosure.

As shown in FIG. 6, a video processing apparatus 6 of this embodiment comprises: a memory 610 and a processor 620 coupled to the memory 610, the processor 620 being configured to perform, based on instructions stored in the memory 610, the video processing method in any of the above embodiments.

The memory 610 can comprise, for example, a system memory, a fixed non-transitory storage medium, and the like. The system memory has stored thereon, for example, an operating system, an application, a boot loader, other programs, and the like.

The video processing apparatus 6 can further comprise an input/output interface 630, a network interface 640, a storage interface 650, and the like. These interfaces 630, 640, 650 as well as the memory 610 and the processor 620 can be connected, for example, through a bus 660. The input/output interface 630 provides a connection interface for input/output devices such as a display, a mouse, a keyboard, a touch screen, a microphone, a sound box, and the like. The network interface 640 provides a connection interface for a variety of networking devices. The storage interface 650 provides a connection interface for external storage devices such as a SD card and a USB disk.

It should be appreciated by those skilled in the art that, embodiments of the present disclosure can be provided as a method, system, or computer program product. Accordingly, the present disclosure can take a form of an entire hardware embodiment, an entire software embodiment or an embodiment combining software and hardware aspects. Moreover, the present disclosure can take a form of a computer program product implemented on one or more computer-available non-transient storage media (comprising, but not limited to, disk memory, CD-ROM, optical memory, and the like) having computer-available program code embodied therein.

So far, the video processing method, the video processing apparatus, and the non-transitory computer-readable storage medium according to the present disclosure have been described in detail. Some details well known in the art have not been described to avoid obscuring the concepts of the present disclosure. Those skilled in the art can fully appreciate how to implement the technical solutions disclosed herein according to the foregoing description.

The method and system of the present disclosure can be implemented in a number of ways. For example, a method and system of the present disclosure can be implemented in software, hardware, firmware, or any combination of the software, hardware, and firmware. The above sequence for the steps of the method is for illustration only, and the steps of the method of the present disclosure are not limited to the sequence specifically described above unless specifically stated otherwise. Furthermore, in some embodiments, the present disclosure can also be implemented as programs recorded in a recording medium, these programs comprising machine-readable instructions for implementing the method according to the present disclosure. Therefore, the present disclosure also covers the recording medium having stored therein the programs for performing the method according to the present disclosure.

Although some specific embodiments of the present disclosure have been described in detail by way of examples, it should be understood by those skilled in the art that the above examples are for illustration only and are not intended to limit the scope of the present disclosure. It should be appreciated by those skilled in the art that modifications can be made to the above embodiments without departing from the scope and spirit of the present disclosure. The scope of the present disclosure is defined by the attached claims.

What is claimed is:

1. A video processing method, comprising:
presenting an avatar of at least one user;
generating a preview image as a dynamic image according to a video content posted by a first user within a preset duration;
playing the dynamic image within an area where an avatar of the first user is located, under the condition that the first user exists in the at least one user, wherein the first user is a user who has posted the video content within the preset duration, and the dynamic image is a related image of the video content; and
presenting the video content posted by the first user in response to an operation of a second user on the dynamic image,
wherein playing the dynamic image within the area where the avatar of the first user is located comprises:
replacing the avatar of the first user with the dynamic image, in response to a user presentation area in an interactive interface being opened wherein the user presentation area comprises the first user.

2. The processing method according to claim 1, wherein the generating a preview image according to the video content posted by the first user within the preset duration comprises:
intercepting, under the condition that a duration of the video content exceeds a threshold, in the video content, a video clip with a duration corresponding to the threshold as the preview image; and
taking the video content in whole as the preview image, under the condition that the duration of the video content does not exceed the threshold.

3. The processing method according to claim 1, wherein the generating a preview image according to the video content posted by the first user within the preset duration comprises:
extracting a plurality of video frames from the video content; and
generating a dynamic picture as the preview image according to the plurality of video frames.

4. The processing method according to claim 1, wherein:
the presenting an avatar of at least one user comprises presenting a user list containing avatars of a plurality of users, the plurality of users comprising a plurality of first users; and
the playing a dynamic image within an area where an avatar of the first user is located comprises playing the dynamic image corresponding to the plurality of first users sequentially within areas where the avatars of the plurality of first users are located according to a sequence of the plurality of first users arranged in the user list, under the condition that the first users exist in the users.

5. The processing method according to claim 1, wherein the presenting an avatar of at least one user comprises:
presenting a user list containing avatars of a plurality of users, the area where the avatar of the first user in the plurality of users is located being provided with a highlighted identification which is used for indicating the first user in the plurality of users.

6. The processing method according to claim 1, wherein the presenting the video content posted by the first user in response to an operation of a second user on the dynamic image comprises:
playing the video content posted by the first user in response to the operation of the second user on the dynamic image.

7. The processing method according to claim 1, wherein the playing a dynamic image within an area where an avatar of the first user is located comprises:
enlarging and displaying the area where the avatar of the first user is located; and
playing the dynamic image within an enlarged display area where the avatar of the first user is located.

8. The processing method according to claim 7, further comprising:

after the playing of the dynamic image is finished, reducing the enlarged display area where the avatar of the first user is located to a size before the enlarging and displaying.

9. The processing method according to claim 1, wherein the presenting an avatar of at least one user comprises:
presenting the avatar of the first user in response to the user presentation area in the interactive interface being opened by the second user.

10. The processing method according to claim 1, wherein the playing a dynamic image within an area where an avatar of the first user is located comprises:
determining a playing frame rate of the dynamic image according to performance of a video playing terminal, wherein the higher the performance of the video playing terminal, the higher the playing frame rate of the dynamic image.

11. A video processing apparatus, comprising:
a display configured to present an avatar of at least one user and present a video content posted by a first user in response to an operation of a second user on dynamic image, wherein the first user is a user who has posted the video content within a preset duration, and the dynamic image is a related image of the video content; and
a processor configured to play the dynamic image within an area where an avatar of the first user is located under the condition that the first user exists in the at least one user, replace the avatar of the first user with the dynamic image, in response to a user presentation area in an interactive interface being opened wherein the user presentation area comprises the first user and generate a preview image as the dynamic image according to the video content posted by the first user within the preset duration.

12. A video processing apparatus, comprising:
a memory; and
a processor coupled to the memory, the processor being configured to perform, based on instructions stored in the memory, the following steps:
presenting an avatar of at least one user;
generating a preview image as a dynamic image according to a video content posted by a first user within a preset duration;
playing the dynamic image within an area where an avatar of the first user is located, under the condition that the first user exists in the at least one user, wherein the first user is a user who has posted the video content within the preset duration, and the dynamic image is a related image of the video content; and
presenting the video content posted by the first user in response to an operation of a second user on the dynamic image,
wherein playing the dynamic image within the area where the avatar of the first user is located comprises:
replacing the avatar of the first user with the dynamic image in response to a user presentation area in an interactive interface being opened wherein the user presentation area comprises the first user.

13. A non-transitory computer-readable storage medium having thereon stored a computer program which, when executed by a processor, implements the following steps:
presenting an avatar of at least one user;
generating a preview image as a dynamic image according to a video content posted by a first user within a preset duration;
playing the dynamic image within an area where an avatar of the first user is located, under the condition that the first user exists in the at least one user, wherein the first user is a user who has posted the video content within the preset duration, and the dynamic image is a related image of the video content; and
presenting the video content posted by the first user in response to an operation of a second user on the dynamic image,
wherein playing the dynamic image within the area where the avatar of the first user is located comprises:
replacing the avatar of the first user with the dynamic image in response to a user presentation area in an interactive interface being opened wherein the user presentation area comprises the first user.

14. The non-transitory computer-readable storage medium according to claim 13, wherein the computer program implements the following steps:
intercepting, under the condition that a duration of the video content exceeds a threshold, in the video content, a video clip with a duration corresponding to the threshold as the preview image; and
taking the video content in whole as the preview image, under the condition that the duration of the video content does not exceed the threshold.

15. The non-transitory computer-readable storage medium according to claim 13, wherein the computer program implements the following steps:
extracting a plurality of video frames from the video content; and
generating a dynamic picture as the preview image according to the plurality of video frames.

16. The non-transitory computer-readable storage medium according to claim 13, wherein:
the presenting an avatar of at least one user comprises presenting a user list containing avatars of a plurality of users, the plurality of users comprising a plurality of first users; and
the computer program implements the following steps:
playing the dynamic image corresponding to the plurality of first users sequentially within areas where the avatars of the plurality of first users are located according to a sequence of the plurality of first users arranged in the user list, under the condition that the first users exist in the users.

17. The non-transitory computer-readable storage medium according to claim 13, wherein the computer program implements the following steps:
presenting a user list containing avatars of a plurality of users, the area where the avatar of the first user in the plurality of users is located being provided with a highlighted identification which is used for indicating the first user in the plurality of users.

18. The non-transitory computer-readable storage medium according to claim 13, wherein the computer program implements the following steps:
playing the video content posted by the first user in response to the operation of the second user on the dynamic image.

* * * * *